(12) United States Patent
Balthes

(10) Patent No.: US 8,367,172 B2
(45) Date of Patent: Feb. 5, 2013

(54) BLOW-MOLDED COMPOSITE COMPOSITIONS AND METHODS

(75) Inventor: Garry E. Balthes, Elkhart, IN (US)

(73) Assignee: FlexForm Technologies, LLC, Elkhart, IN (US)

( * ) Notice: Subject to any disclaimer, the term of this patent is extended or adjusted under 35 U.S.C. 154(b) by 557 days.

(21) Appl. No.: 11/591,332

(22) Filed: Nov. 1, 2006

(65) Prior Publication Data

US 2007/0098972 A1    May 3, 2007

Related U.S. Application Data

(60) Provisional application No. 60/733,120, filed on Nov. 3, 2005.

(51) Int. Cl.
*B32B 1/04* (2006.01)
*B32B 1/08* (2006.01)
*B27N 5/02* (2006.01)

(52) U.S. Cl. ............ 428/36.4; 428/34.4; 428/34.5; 428/34.6; 428/34.7; 428/35.6; 428/35.7

(58) Field of Classification Search ........... 428/34.1, 428/34.4, 34.5, 34.6, 34.7, 35.7, 36.4, 36.5, 428/36.6, 36.7, 36.9, 36.91, 35.6
See application file for complete search history.

(56) References Cited

U.S. PATENT DOCUMENTS

| | | | |
|---|---|---|---|
| 5,792,539 A * | 8/1998 | Hunter | 428/72 |
| 6,464,486 B1 | 10/2002 | Barray et al. | |
| 6,627,278 B1 | 9/2003 | Sandstrom et al. | |
| 6,852,806 B2 | 2/2005 | Sasagawa et al. | |
| 2003/0118806 A1* | 6/2003 | Schonebeck | 428/304.4 |

OTHER PUBLICATIONS

International Search Report, Sep. 17, 2007.

* cited by examiner

*Primary Examiner* — Walter B Aughenbaugh
(74) *Attorney, Agent, or Firm* — Barnes & Thornburg LLP

(57) ABSTRACT

A blow-molded composite and method of making the same is provided. The composite includes first and second fibrous layers and first and second film layers. The first fibrous layer includes randomly oriented fibers dispersed throughout the thickness of the layer and has first and second surfaces. The first film layer has first and second surfaces such that the second surface of this layer is bonded to the second surface of the first fibrous layer. The second film layer has first and second surfaces as well, but only a portion of the first surface is bonded to the first surface of the first film layer. At least one cavity exists between the first and second film layers. The second fibrous layer also comprises randomly oriented fibers dispersed throughout the thickness of the layer and has first and second surfaces. The first surface of the second fibrous layer is bonded to the second surface of the second film layer.

10 Claims, 12 Drawing Sheets

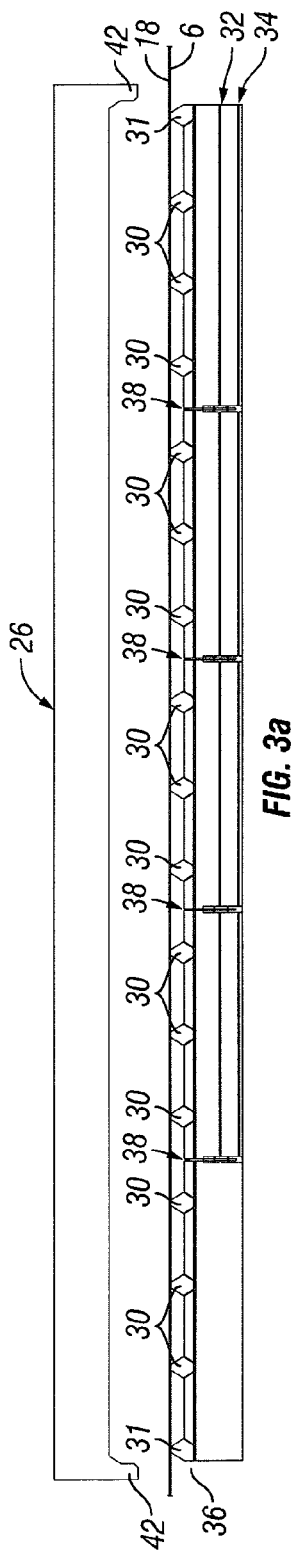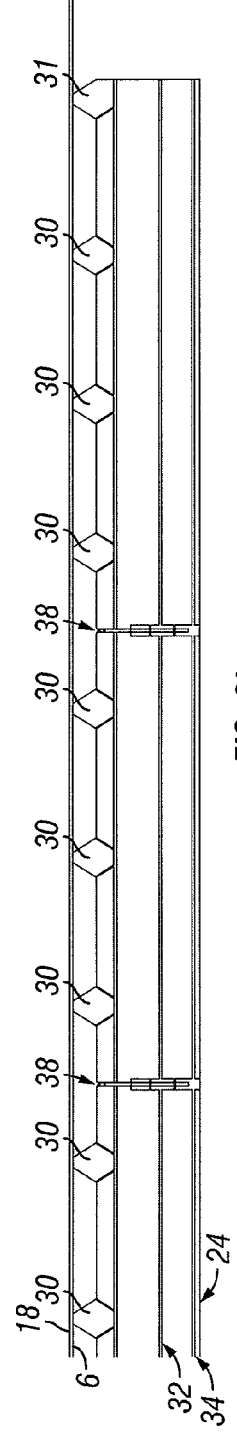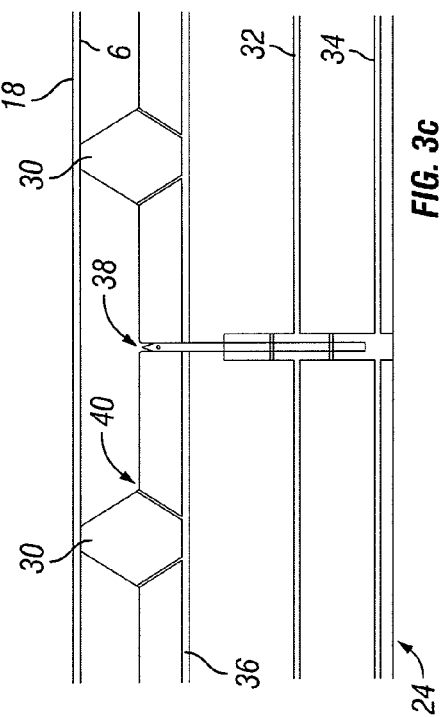

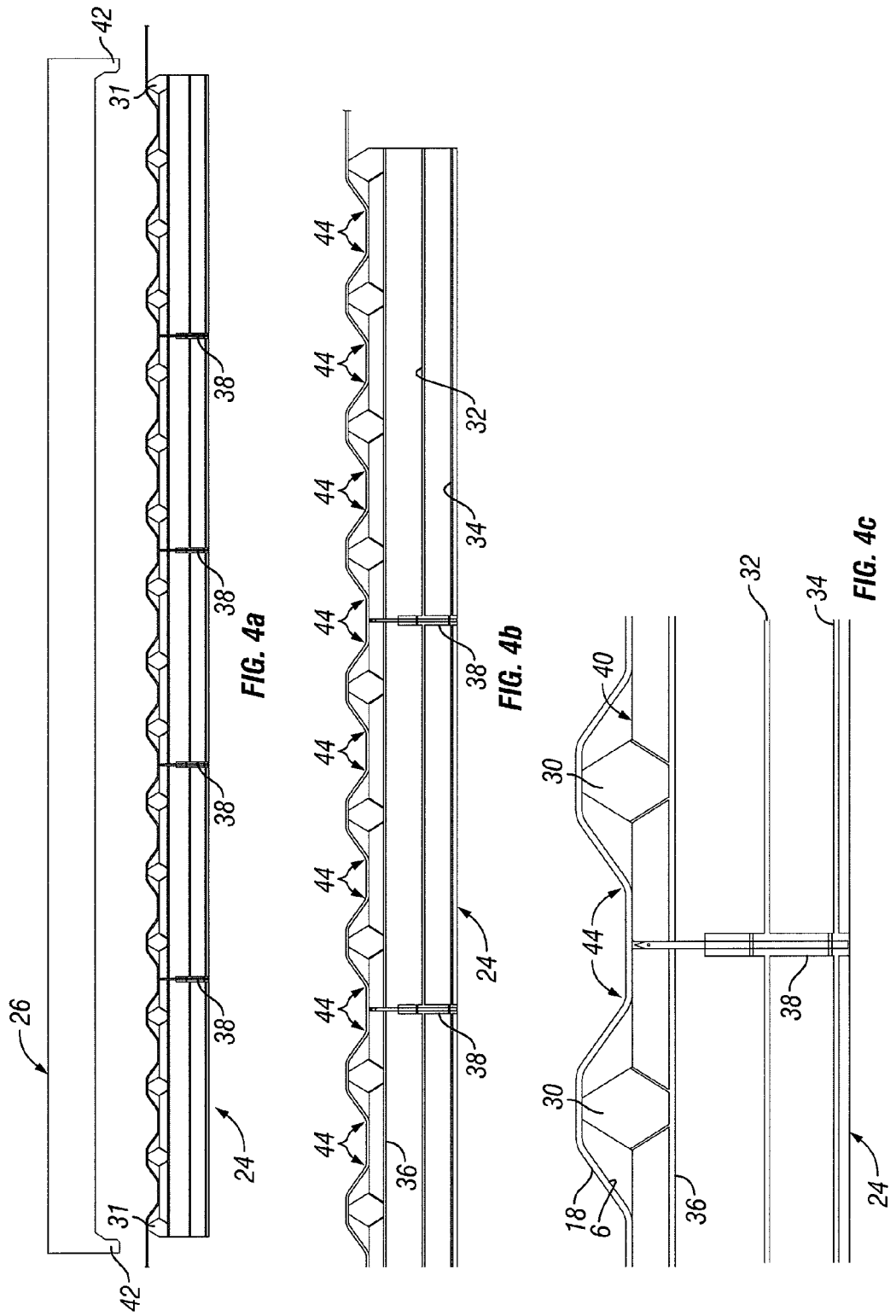

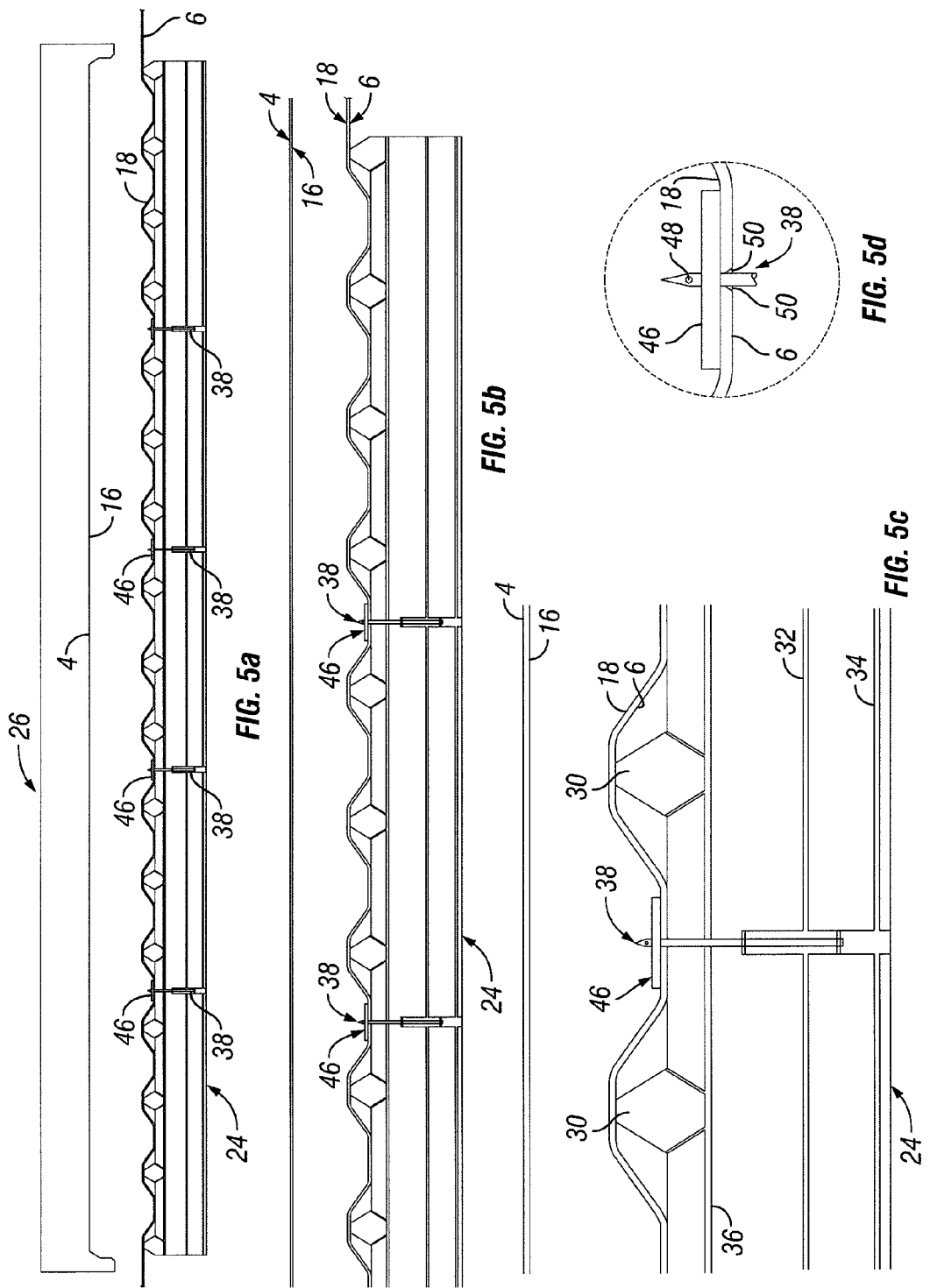

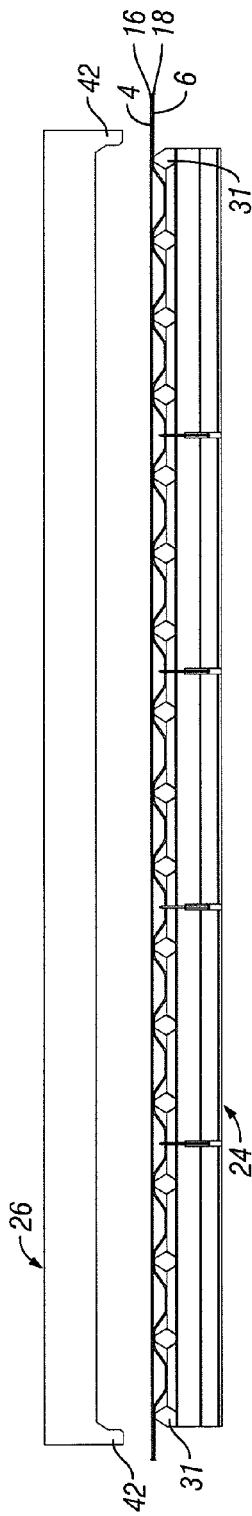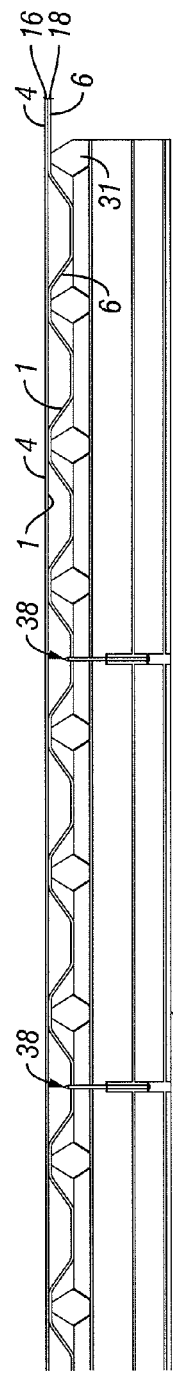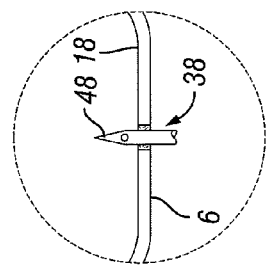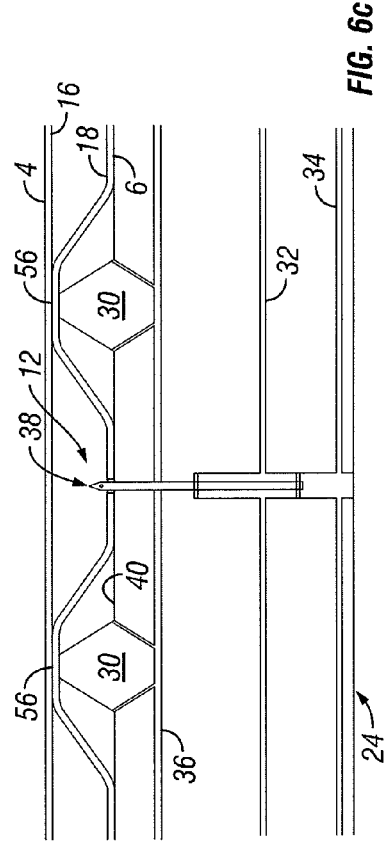
FIG. 6a
FIG. 6b
FIG. 6d
FIG. 6c

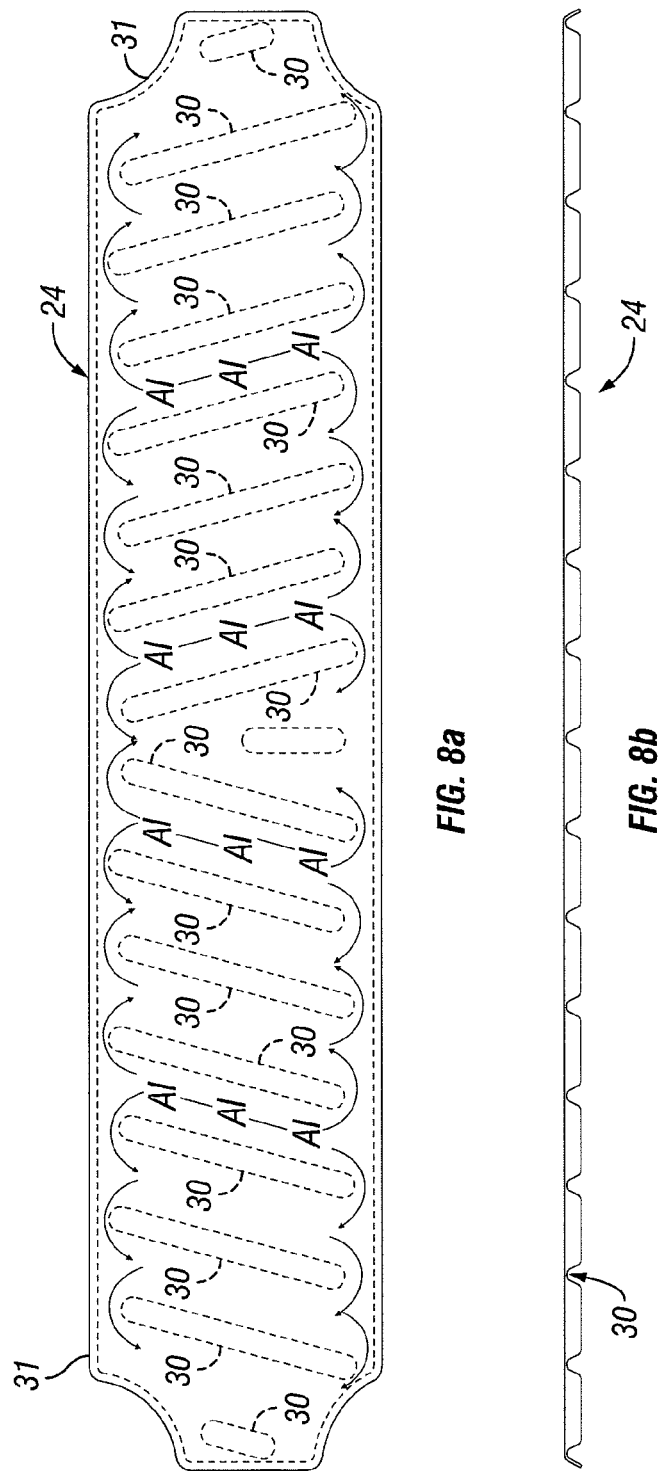

BLOW-MOLDED COMPOSITE COMPOSITIONS AND METHODS

RELATED APPLICATIONS

The present application is related to and claims priority to U.S. Provisional Patent Application, Ser. No. 60/733,120, filed on Nov. 3, 2005, entitled *Blow-Molded Composite Compositions and Methods*. The subject matter disclosed in that provisional application is hereby expressly incorporated into the present application.

TECHNICAL FIELD

The present disclosure relates to fibrous structures and particularly to compositions and methods of blow molding fibrous material structures.

BACKGROUND AND SUMMARY

Blow-molding is a common technique for forming plastic (or other non-porous material) containers, such as bottles or flasks. Plastic is the conventional choice for blow-molding because of its thermal properties and its lack of porosity. Typical plastic containers begin as an injection-molded or extruded preform that is preheated and placed into a mold formed in the shape of the container. To achieve final shape, a rod is disposed in the preheated preform, stretching it to about the length of the mold. Once the preform is sufficiently stretched, a blast of air is dispensed therein which pushes the walls of the preform against the inner surface of the mold. The resulting shape of the preform becomes that of the desired container.

The lack of porosity in plastic makes it receptive to force produced by the air. In contrast, natural fiber structures, such as randomly oriented fiber mats, are not conducive to blow-molding because they are extremely porous. If blow-molding a fibrous substrate is attempted conventionally, the forced air simply penetrates and passes through the substrate's pores and interstices. The force of air will fail to push the mat into the molded shape.

Accordingly, an illustrative embodiment of the present disclosure provides a blow-molded composite comprising first and second fibrous layers and first and second film layers. The first fibrous layer comprises randomly oriented fibers dispersed throughout the thickness of the layer and having first and second surfaces. The first film layer has first and second surfaces such that the second surface of this layer is bonded to the second surface of the first fibrous layer. The second film layer has first and second surfaces as well, but only a portion of the first surface is bonded to the first surface of the first film layer. In addition, at least one cavity exists between the first and second film layers. The second fibrous layer also comprises randomly oriented fibers dispersed throughout the thickness of the layer and has first and second surfaces. The first surface of the second fibrous layer is bonded to the second surface of the second film layer.

In the above and other illustrative embodiments, the blow-molded composite may further comprise: the fibers being selected from a group consisting of synthetic fibers and natural fibers, and wherein the fibers are present in an amount ranging from over 0% to about 70%; the first and second fibrous layers comprising a binder that is bonded with the fibers; the binder being selected from a group consisting of polypropylene, polyester, nylon, and polyethylene, and wherein the binder is present in an amount ranging from over 0% to about 70%; the first and second films resist bonding at about their melting temperatures; the first and second films comprising nylon-6 and nylon-66; the second surface of the first film layer and the first surface of the second film layer comprising a corona surface, and wherein the first surface of the first film layer and the second surface of the second film layer are non-corona surfaces; the first fibrous layer comprising a weight of about 800 grams per meter square to about 3000 grams per meter square, fibers being natural or synthetic fibers present in an amount ranging from above 0% up to about 70% of formulation; the binder being polymer fibers present in an amount ranging from about 30% up to about 70% of formulation, and a needle punch density from about 20 per square centimeter up to about 80 per square centimeter; the second fibrous layer comprising a weight of about 800 grams per meter square to about 3000 grams per meter square, fibers that are natural or synthetic fibers present in an amount ranging from about 30% up to about 60% of formulation, the binder being polymer fibers present in an amount ranging from about 40% up to about 70% of formulation, and a needle punch density from about 20 to about 65 per square centimeter.

Another illustrative embodiment of the present disclosure provides method of blow-molding a fibrous composite. The method comprising the steps of: providing upper and lower fiber layers each comprising randomly oriented fibers and a binder dispersed throughout the thickness of each layer, and each having first and second surfaces; providing upper and lower film layers, each having first and second surfaces; placing the first surface of the upper film layer adjacent the second surface of the upper fiber layer; placing the second surface of the lower film layer adjacent the first surface of the lower fiber layer; locating the lower fiber and film layers on a lower blow-mold plate having a surface, and comprising at least one protrusion extending from that surface and at least one fluid passage disposed in the plate; applying a vacuum through the passage between the surface of the lower blow-mold plate and the lower fiber layer; drawing the lower fiber and lower film layers against at least a portion of the surface of the lower blow-mold plate; piercing the lower fiber and lower film layers with a pin having an opening disposed therein; extending the opening beyond the first surface of the lower film layer; placing the first surface of the upper film layer against the first surface of the lower film layer forming a cavity around at least a portion of the pin between the first surfaces of the upper and lower film layers; applying pressure against the upper fiber and film layers against the lower film and fiber layers; and blowing fluid from the opening into the cavity to cause at least the lower film and fiber layers to take the shape of the lower blow-mold plate and bond the first and second films together.

In the above and other illustrative embodiments, the blow-molded composite may further comprise: heating the upper and lower fiber layers prior to placing the upper and lower film layers thereon; the film layers lying together but not sticking together; blowing fluid from the opening into the cavity wherein the fluid is a gas; sealing the periphery of the upper and lower fiber and film layers prior to blowing fluid; locating the lower fiber and film layers on a lower blow-mold plate having a surface, and comprising a plurality of protrusions extending from that surface and a plurality of fluid passages disposed in the plate; locating a clamp finger onto the first surface of the second film layer prior to blowing fluid from the opening; drawing down at least a portion of the pin to cause the lower film to form a seal around the pin prior to blowing fluid from the opening into the cavity; continuing to draw a vacuum against the lower fiber layer while blowing fluid into the cavity Additional features and advantages of this disclosure will become apparent to those skilled in the art upon consideration of the following detailed description of the illustrated embodiment exemplifying the best mode of carrying out the disclosure as presently perceived.

BRIEF DESCRIPTION OF DRAWINGS

The present disclosure will be described hereafter with reference to the attached drawings which are given as non-limiting examples only, in which:

FIGS. 3a-c are elevational side views of an illustrative composite located in an illustrative blow-mold press that is part of the blow-molding process;

FIGS. 4a-c are additional side views of the fiber composite located in the blow-mold press that is part of the blow-molding process, wherein the air pins withdrawn;

FIGS. 5a-d are additional side views showing the fiber composite located in a blow-mold press that is part of the blow-molded process, wherein the air pins are extended through composite;

FIGS. 6a-d show additional side views of the fiber composite in a blow-mold press that is part of the blow-molded process, and sharing closed cavities made from the composite;

FIGS. 8a and b are top plan and side cutaway views, respectively, of an illustrative tooling that shows the approximate fluid flow pattern made during the blow-molding process;

Figure 1A:
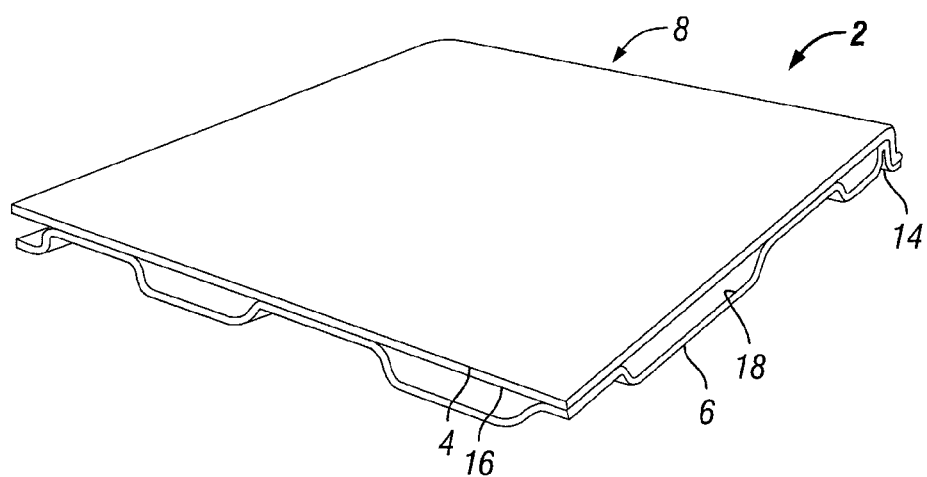
FIGS. 1a and b are top and bottom perspective views, respectively, of an illustrative embodiment of a blow-molded fiber composite panel.

Corresponding reference characters indicate corresponding parts throughout the several views. The exemplification set out herein illustrates embodiments of the blow-molding composition and method, and such exemplification is not to be construed as limiting the scope of the blow-molding composition and method in any manner.

DETAILED DESCRIPTION OF THE DRAWINGS

Figure 1B:
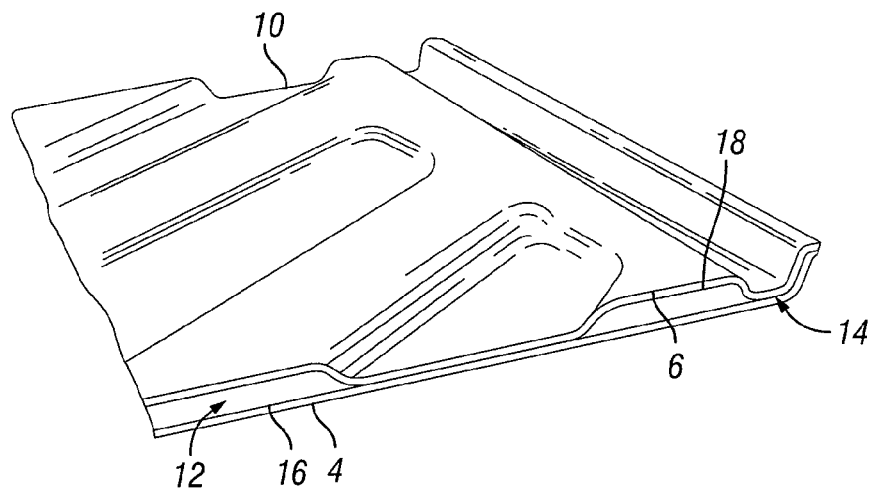

Top and bottom perspective views of an illustrative blow-molded fiber composite panel 2 are shown in FIGS. 1a and b, respectively. In an illustrative embodiment, upper and lower sheets or layers 4 and 6 composed of randomly-oriented natural fibers/polypropylene panels, are used. As shown in FIG. 1a, composite panel 2 comprises upper fiber layer 4 illustratively configured to receive a fascia material layer 8, such as carpeting in the case of a floor board. Lower fiber layer 6 is illustratively a ribbed layer that serves the dual purpose of providing strength to fiber layer 4, and defining the air chamber or chambers created during the blow-molding process. Shown in the bottom view of composite panel 2 in FIG. 1b, is an illustrative scrim layer 10 applied on the lower side of fiber layer 6. This view also shows more illustrative contour of air chamber or cavity 12 formed between fiber layers 4 and 6. It is appreciated from these views that composite panel 2 shown is but just a section or portion of the total composite panel formed. In one embodiment, a sealed periphery rib 14, as partially shown in FIG. 1b, extends about the periphery of panel 2. In an illustrative embodiment of the manufacturing process, the periphery of fiber layers 4 and 6 are sealed to prevent fluid or air that is filling cavity 12 to leak out through the edges of the structure. It is further appreciated that the compositions described herein are illustrative. In other illustrative embodiments, synthetic, woven or random, porous substrates may be used.

Though not readily visible in these views, located between fiber layers 4 and 6 are polymer film layers. (See, rather, FIGS. 2-7.) The particular film used, however, is of a type that can be heated up to about molding temperature, or the film's melt temperature, without the film sheets bonding upon contact. Such film sheets may also require the presence of pressure to bond. Hence, the two sheets of film can be heated and yet not bond together until a pressure force is also applied. In one embodiment such film may have a corona side and non-corona side. The corona side of one film layer may face the corona side of the other film layer. The non-corona side of each film layer may face a fiber substrate. The non-corona side of the films can bond with the fiber/binder material of the mats during a preheating stage. This may allow the binder molecules (such as polypropylene, for example) to intermingle with the fiber material and with the film to create a mechanical bond. An illustrative polymer film suitable for this purpose is the C-35 film by BASF Corporation. This film combines nylon-6 and nylon-66 that reduces shrinkage in the presence of heat. This film also maintains its non-permeability status while being heated. Furthermore, it has the ability to allow corona treating of one side and not the other. It is appreciated that in alternative embodiments, other materials may be used that accomplish the same or similar utilities as the films described herein.

Conventional films having conventional bonding characteristics may be ineffective for blow-molding applications since they may bond as soon as they touch each other. This is because dimensional stability and mechanical separation of the films cannot be accomplished. In one illustrative embodiment, the films used in the blow-molding process are dimensionally stable. For example, a 12 inch by 12 inch film can be heated to 200° C. and then cooled. The film will maintain its 12 inch×12 inch dimension. If the film is 12 inch×12 inch going in cold, it should come out 12×12 inches. Few polymers may exist that will resist that type of exposure without changing or deforming their dimensions. Also, separation between the film sheets during the blow-molding process allows the forced air to be deposited between films.

Figure 2:
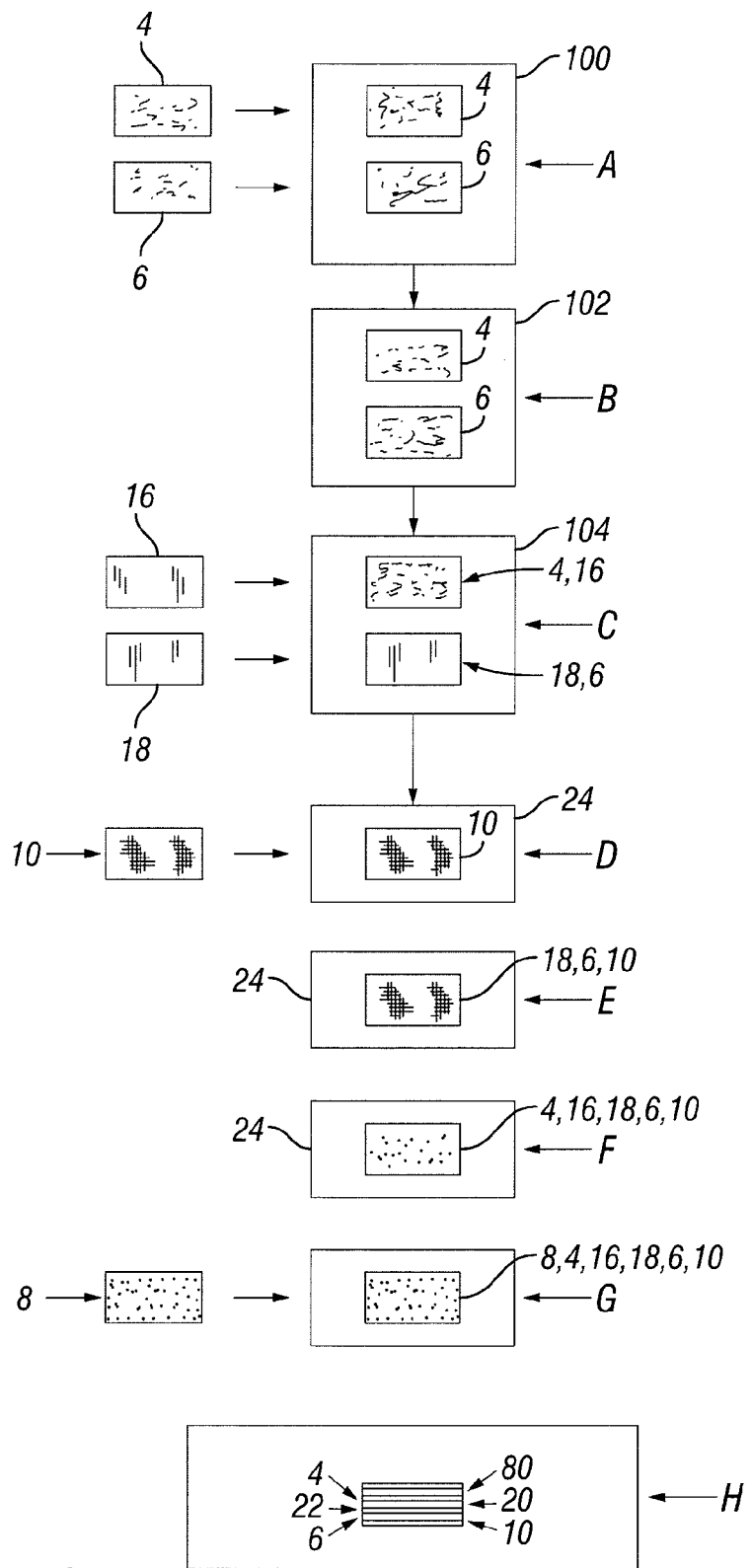
FIG. 2 is a process flow diagram of an illustrative embodiment of a blow-molded manufacturing process for a fiber structure.

A process flow diagram for an illustrative embodiment of a blow-molded manufacturing process for a randomly-oriented fiber composite is shown in FIG. 2. Upper and lower fiber layers 4 and 6, respectively, are aligned illustratively and preheated to approximately 115° C. using contact or hot air heating. Film layers 16 and 18 are placed over fiber layers 4, 6, respectively. In one illustrative embodiment, the oven can be raised to a final heating temperature of about 200° C. It is appreciated that alternative heat processes can also be employed. It is also appreciated that some hot air preheater systems might prevent the film layer from being added at this stage. This is because the hot air may not pass through the layer and into the fiber layer. Thus, the hot air cannot contact the fibers of the mat to raise their temperature. To compensate for this, the temperature of the mats can be raised to the point where moisture is flashed off. The mats then advance to receive the films and then move into the final heating contact oven. Here the temperature of the composite with film is brought up to molding temperatures (about 200° C.). In contrast, when using a single oven, the films can actually be attached to the natural fiber mats prior to entering the oven. This will heat the composite mat with film from room temperature up to molding temperature (200° C.) in one step. In certain circumstances, the contact oven may decrease material handling steps.

Alternatively, double heaters may be used to reduce cycle time. Double heaters may reduce the heating time to about half that required for a single oven. For example, use of a single contact oven may take approximately 80 to 90 seconds to heat an approximately 1800 gram mass to molding temperature. In contrast, two ovens, one being hot air and the other being contact, can preheat the mat at higher temperature ranges in about 25-35 seconds. The initial hot air heating stage may raise the mat's temperature from 22° C. to 115° C. in about 15 to 20 seconds. The mat can then go to the contact heating stage to increase the temperature to about 200° C. It is appreciated that the cycle time may also be affected by the tool close time requirements.

After the heat stage and prior to advancing heated composite from oven to tool, illustratively a scrim or other material can be laid down on the blow-mold tool. Lower fiber layer 6 with film 18 corona side up is placed on top of scrim 10. Upper fiber layer 4 with film 16 with film and corona side down is laid on top of film 18 and layer 6. Fascia layer 8, such as carpeting or other material, may be placed on top of composite layer 4. Illustratively, fascia layer 8 may include a surface having a compatible resin that bonds with the binder, such as polypropylene, upper layer 4. Alternatively, the surface may be polyester or other similar-type fibers that can mechanically bond to the fibers, such as natural fibers, of the upper fiber layer 4. Mechanical bonding can be illustratively described as literally thousands of small fiber ends per square centimeter protruding below the opposite side of the finished surface of fascia layer 8, wherein during the mechanical compression of the blow-mold process, the fibers embed in the fibers and melted binder of the upper fiber layer 4. Once the binder sets (i.e., solidifies), the fibers from the two layers lock in and bond together.

It is appreciated that any decorative material can be applied to upper fiber layer 4, as long as the material is either compatible with the chemistries of the fiber layer for chemical bonding, or has a suitable backing for mechanical bonding. Consequently, as shown at the bottom of FIG. 2, the illustrative composite from top to bottom includes carpet or fascia layer 8, randomly-oriented fiber layer 4, films 16 and 18 at blow line 20 and film bond line 22, randomly-oriented fiber layer 6, and finally scrim 10. Illustrative embodiments of the actual blow-molding process for this and other illustrative composites are further described herein below with reference to FIGS. 3-8.

An illustrative molding process, as depicted in FIG. 2 using a twin heat oven system, is as follows:

A. Two composite layers or sheets 4, 6 are oriented onto a transfer belt 100.

B. Transfer belt 100 carries the sheets into preheat hot air oven 102; heat cycle time is set at about 25 seconds; oven air heating air temperatures are illustratively set at about 120° C.

C. Preheated composite sheets 4, 6 exit hot air oven 102, transferred by conveyor belt to contact heat oven 104; belt deposits sheets 4, 6 onto lower heating platen as it withdraws; two films 16, 18, one with corona surface treatment up is laid on first sheet, second film with corona side down is laid on second sheet; contact oven 104 closes holding composite sheets with laid films between upper and lower heating platen under constant pressure; sheets are heated to about 200° C. for about 30 seconds.

D. Illustratively prior to oven opening, a lower scrim 10 is laid on the bottom forming tool 24.

E. Contact oven 104 opens, heated composite sheets are transferred to the tool with first layer laid onto the scrim with film up, air injector clamp is engaged, air pins are engaged piercing through composite and film layer, air injector clamp is disengaged, F. The upper sheets 4, 16 are then laid onto lower sheets 18, 6, 10, tools 26 and 24 close and air pressure is injected via air pins pressurizing the area between the two films causing the composite to form out to the contour of the lower half mold; at completion of cooling cycle air pressure is removed from the composite and air injector pins retracted before tool is opened.

G. The upper finished carpet is retained in upper forming tool 26;

H. Closing time of tool is variable depending on the gram weight of the composite and heat transfer capability of tool material and supporting cooling; close time is determined by the temperature of the finished molded part at tool opening. Part temperature range at tool opening is typically between about 32° C. and about 50° C.

Several front elevational side views of an illustrative composite located in separated blow-mold plates or tools 24 and 26 are shown in FIGS. 3a-c. Lower fiber layer 6, with film layer 18 lying on top, is positioned on ribs 30 of lower tool 24. It is appreciated that this view merely shows an illustrative profile of rib 30 which assists forming the channels or air passageways in lower tool 24. (See also FIG. 8a.) Also formed in lower tool 24 is air injection pathway 32, pneumatic pin actuation pathway 34, and vacuum line 36.

Lower tool 24 may comprise a plurality of both ribs 30 and injector pins 38, as shown in FIGS. 3a and b. Each injector pin 38 can be selectively recessed below the molding surface 40 of lower tool 24. By activating pneumatic pin actuation pathway 34, forced air may cause pin 38 to pierce through layers 6 and 18. Fluid from air injection pathway 32 can then be forced out above film 18. Conversely, vacuum line 36 is illustratively configured to pull any gases out from between fiber layer 6 and molding surface 40, as well as assist drawing or holding layer 6 against lower tool 24.

The upper tool 26 is normally configured to engage fascia surface 8 and upper fiber layer 4. (See, also, FIGS. 5a-c.) In addition, the lower and upper tools 24, 26, respectively, compress the periphery of layers 4 and 6 during the blow-molding process to form a seal thereabout preventing the forced air from escaping between the layers. In this illustrative embodiment, upper tool 26 includes a flange 42 disposed about the periphery thereof configured to engage the layers 4, 16 and compress them together against periphery rib 31 to create this sealed periphery rib 14. (See, also, FIGS. 1a and b.)

It is appreciated that in one embodiment layers 4 and 16 can be subjected to a temperature to about 200° C. As previously discussed, the fibrous material and the film layer are preheated to bond the films to their respective fiber layer. After the layers are preheated, they are placed on lower tool 24. It is further appreciated that the blow-mold assembly can be employed on a standard press, since the configuration of the tooling that enables the blow-mold process. The press simply provides pressure and can, thus, be conventional as known by those skilled in the art.

Several elevational views of toolings 24 and 26 at varying magnification are shown in FIGS. 4*a-c*. This view shows the same structures as FIGS. 3*a-c*, except that now a vacuum is being applied through pathway 36 drawing the composite layers 6 and 18 down toward molding surface 40 in directions 44. This can be thought of as analogous to the pre-forming step used in conventional blow-molding. Essentially, the vacuum creates a lower pressure on the molding surface 40, as compared to the exterior atmosphere. This causes the composite to begin forming the shape of the mold. Illustratively the vacuum line runs through each cavity and in the corners of the ribs 30 to draw the composite down as shown. At this stage, injection pin 38 has not yet pierced through composite layers 4 and 16.

In the views shown in FIGS. 5*a-d*, a needle clamp which comprises needle clamp finger 46 is placed on the recessed portions of layers 6 and 18. Clamp finger 46 is illustratively configured with a hole or bore to allow injector needle 38 to be disposed therethrough. The hole in the finger lines up with needle pin 38, which, by virtue of pneumatic pin actuator pathway 34, pushes pin 38 through layers 6 and 18 piercing the same and exiting up through clamp finger 46. Clamp finger 46 essentially holds layers 4 and 16 as needle 38 pierces its way therethrough. As shown in FIG. 5*d*, pin 38 is extended upward to the extent air passage 48 is exposed above film layer 18. It is contemplated that in one illustrative embodiment, also shown in FIG. 5*d*, as pin 38 penetrates layers 6 and 18, material 50 in the layers is drawn upward in the direction of travel of pin 38. It is appreciated that when needle 38 retracts, material 50 is drawn downward and is compacted creating a natural seal about pin 38. Also shown in FIG. 5*a* is the introduction of upper fiber layer 6 with film 18 located thereon, facing film 16 on lower tool 24.

In FIGS. 6*a-d*, clamp fingers 46 are retracted and layers 4 and 16 are introduced to layers 6 and 18. (See, e.g., FIG. 6*c*.) In the illustrated embodiment, needle 38 is retracted to a lower position causing the upturned material 50 to pull downward and compact around needle 38 forming the seal. (See FIG. 6*d*.) As shown in FIG. 6*a*, layers 6, 18, 4, and 16 extend beyond upper tools 24 and 26, and specifically beyond flange 42 and periphery rib 31. This creates seal 14 about the periphery of the composite when upper and lower tools 24 and 26, engage. The interior of the composite also now includes cavities 12 and bond points 56. (See FIG. 6*c*.) With respect to the placement of air passage 48 in needle 38, one embodiment contemplates the hole being directed towards the longest dimension of channel between ribs. In other words, the holes may be directed towards the longest cavity length or lengths within the structure. It is contemplated that in certain embodiments, a significant amount of air pressure (80 to 90 psi, for example) may be directed into cavities 12. It is not desirous for that air pressure to rupture the film layers. This may occur if the forced air is directed toward a proximate film surface. Accordingly, the placement of holes 48 should be considered to minimize this risk.

Although bond points 56 exist between the two sets of composite layers, in one illustrative embodiment, even if the films themselves do not bond at this step, even if the films touch each other. Illustratively the film layers contemplated in this disclosure receive substantial pressure to cause them to bond, even if they are close to their molten stage. For example, mating conventional polymer films together, such as polypropylene films that are then heated to about melt stage, bond immediately upon contact. Once the polymer films touch each other, they physically exchange molecules and lock together. The result is that air cannot be blown in between film layers to separate the same with any control. At some point one film will pick up some of the second film's mass which may cause tearing and ultimately loss of permeability of the films. In other words, a hole is blown through the film. Conventional foams may suffer from the same phenomena. For example, heating up the foams may create a thick mass of polymer as soon as one foam touches the other foam and, thus, permanently bond together.

When using appropriate C-35 films or the like, despite having sheet to sheet contact on the two corona surfaces, they do not stick together. They simply lay together. When the tool is closed, as shown in FIG. 5, high compression zones are created at the top portions of each of ribs 30 and around the outer perimeter of rib 31. The force creates an immediate bond at points 56. But the film areas between the ribs do not bond, since they are under no compression.

Figure 7A:
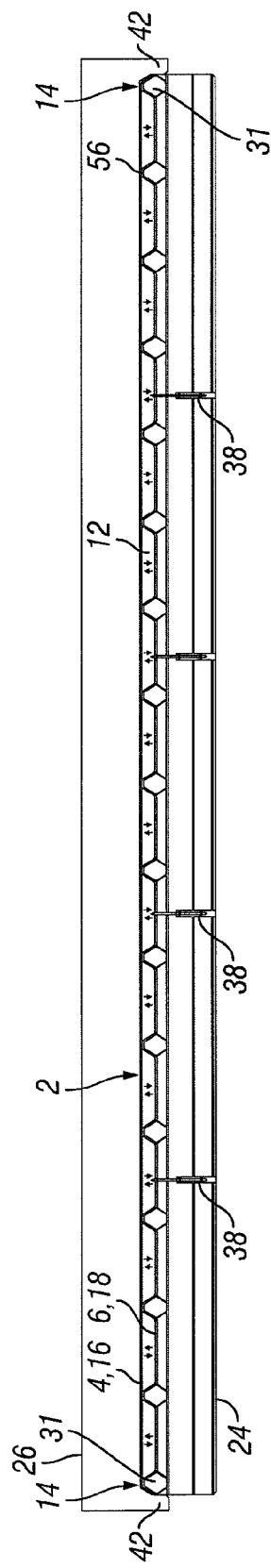
FIGS. 7a and b are side views of the fiber composite being blow-molded in a blow-mold press with the layers blown against the plates when compressed air is introduced to form the full cavities.
Figure 7B:
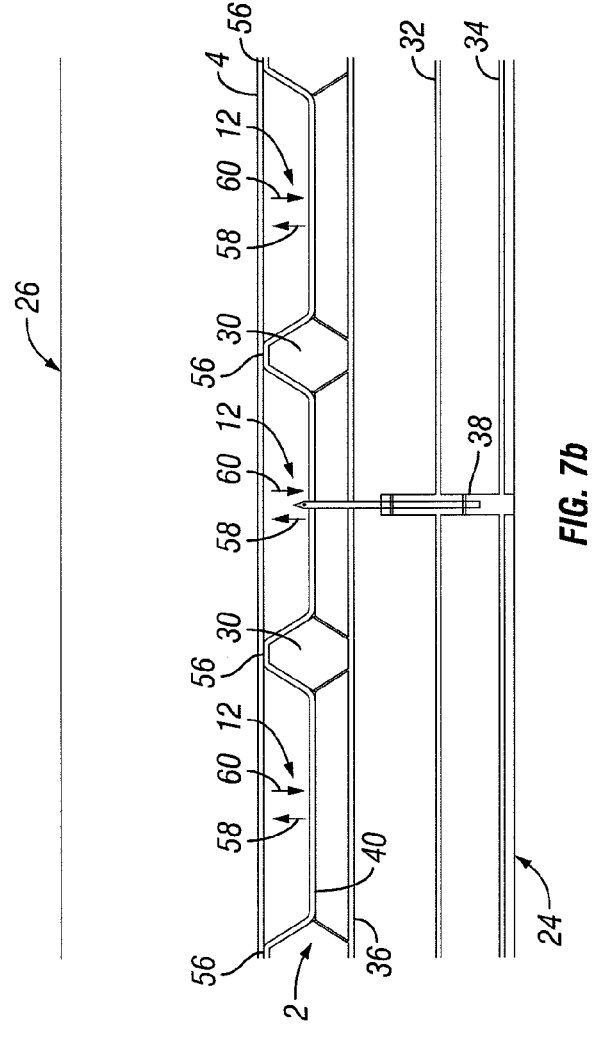

In FIGS. 7*a* and *b*, upper tool 26 has lowered and begins compressing the periphery of the composite at flange 42 and rib 31 to create the seal 14 on composite structure 2. In addition, bond points 56 are also bonding. As shown in FIG. 7*b*, air from needles 38 is injected into cavities 12 causing layers 6 and 18 to take the shape of the molding surface 40. Layers 4 and 16 form the illustrative flat upper surface. It is appreciated that in one illustrative embodiment, as air is being blown into cavities 12, vacuum from line 36 is still drawing out air between layer 6 and molding surface 40. Arrows 58 and 60 located within cavities 12 indicate the forces created by the air that forms the cavity between the two film sheets 16 and 18, and layers 4 and 6. As the portions of layers 4, 16, 6, and 18 are separated in cavities 12, upper tool 26 is bonding films 16 and 18 at bond points 56. In one illustrative embodiment, a pressure of about 50 psi can be used to blow-mold a part. In another illustrative embodiment, about 50 psi is applied to the composite at a temperature of approximately 200° C. A force upwards of 110 psi may be used in other embodiments as well.

Once the blow-molded part has been formed, it is then cooled. A vacuum may be applied to composite 2 during this cooling cycle. In an illustrative embodiment, the upper and lower tools are chilled by water or some other cooling agent until they reach about 32° C. to possibly about 50° C. The composite stays in the tool long enough to diffuse or dissipate the heat. The composite is allowed to cool so it becomes dimensionally stable. There is a possibility that removing the composite from the mold while hot could cause warping. In alternative embodiments this could be desired depending on the contemplated final shape of the blow-molded part.

Once the tool is fully open and injector pins 38 retracted, the vacuum pull is turned off. In fact, the pressure in the vacuum lines can be reversed to lift the part out of the tool. The composite is finished and can be moved to post-mold trimming where any outer flashings on the panel are trimmed down to the final dimensions. Alternatively, the composite may be trimmed in the tool using a trim edge knife or other cutting tool.

A distinction between blow-molding and mechanical press molding is that the former uses air and/or a combination of air and mechanical pressure as a substitute for mechanical force used by the latter. In one particular embodiment, the blow-mold process uses a combination positive and negative air pressures. There is first a vacuum creating a pressure gradient on the lower layer pulling it down. Second, pressurized air is introduced between the films to push the mass of the composite against the mold walls. It is appreciated that the amount of mass needed to stretch and draw to form the mold affects the composition and size of the starting fiber layer(s). There is a limited amount of stretchable mass available to be drawn to the shape of the mold. For example, if 1 inch exists between ribs, but the total cavity measurement is 2 inches, a 50% reduction on mass going to result in the lower sheet. This reduction will need to be accounted for when designing the lower fiber layer.

Top plan and side cut away views of an illustrative tooling, in addition to an approximate fluid flow pattern during the blow-molding process, is shown in FIGS. 8a and b. In this illustrative embodiment, lower tool 24 is shown including ribs 30 (drawn in phantom) and periphery rib 31. It is appreciated from this view how air pressure from pins 38 can be distributed between the ribs and throughout the mold. The cut away side view of FIG. 8b shows the contour of the tool which is similar to that shown in FIGS. 3-7.

Figure 9:
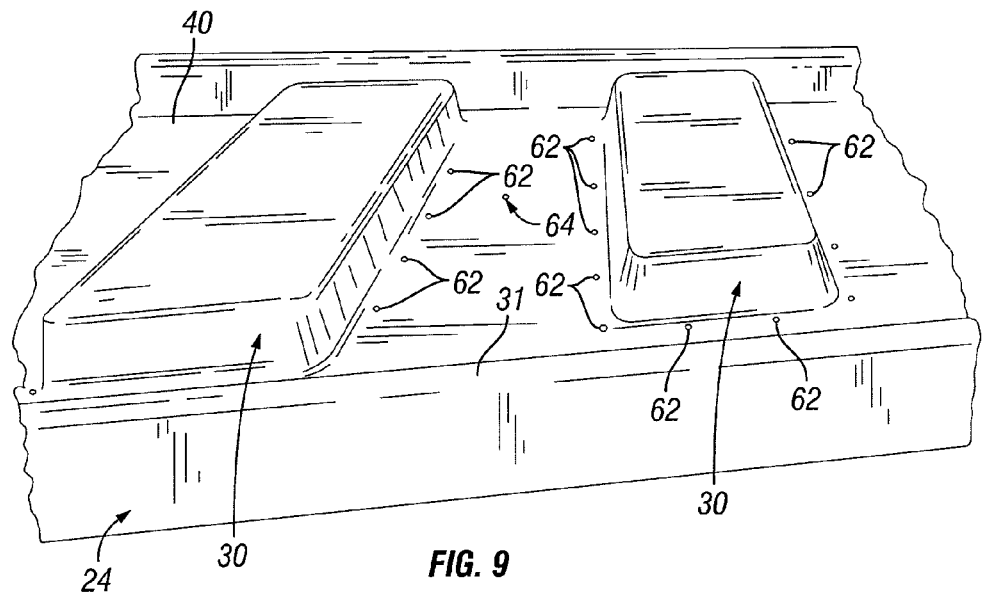
FIG. 9 is a perspective view of an illustrative bottom tool plate.
Figure 10:
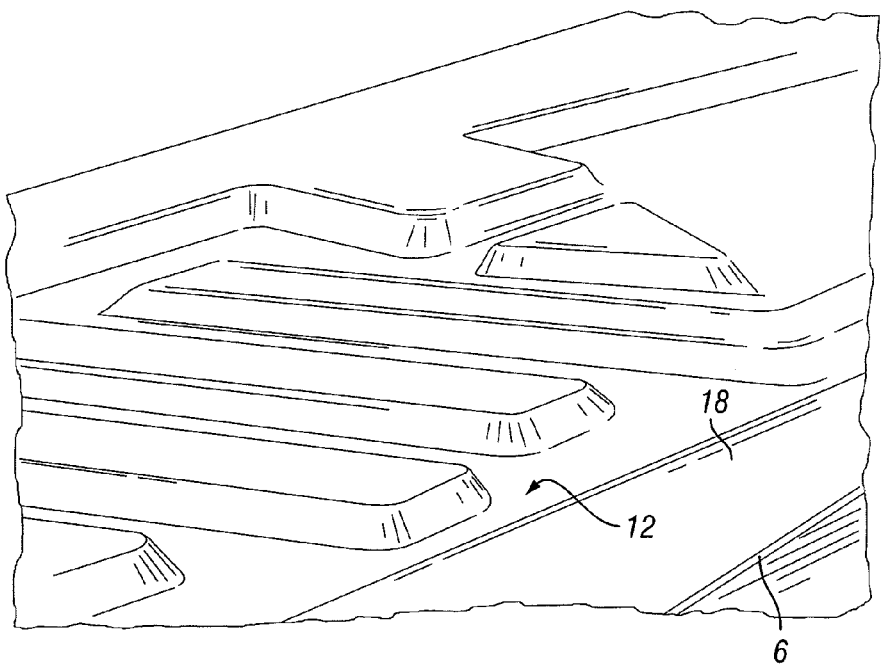
FIG. 10 is a perspective view of a fiber mat laying on the bottom tool plate with a vacuum drawing the mat against the form of the tool plate.
Figure 11:
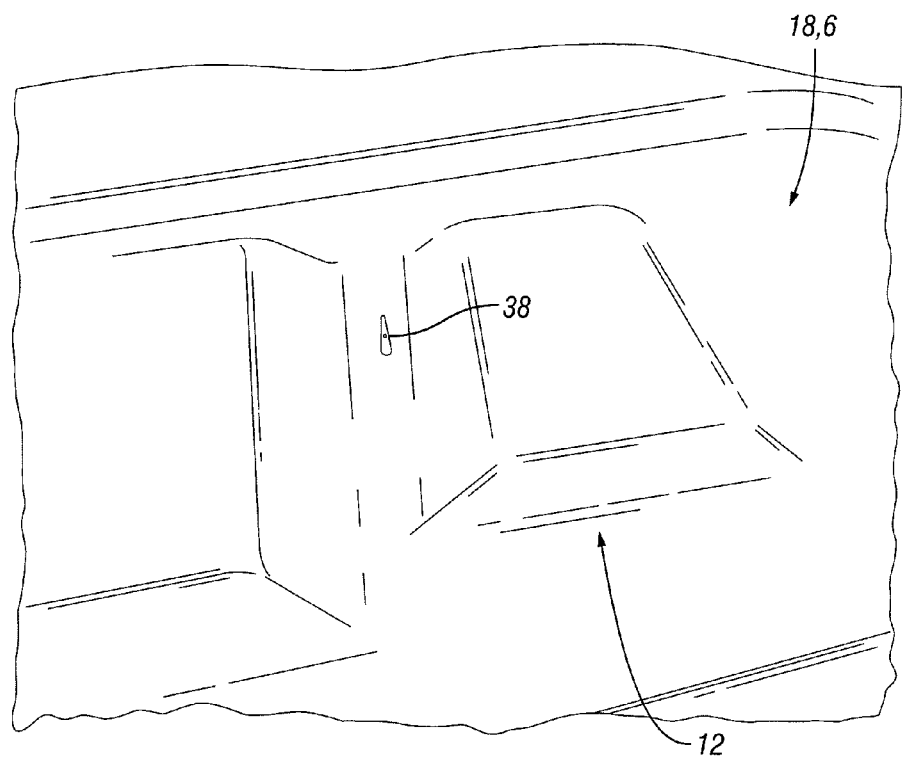
FIG. 11 is a perspective view similar to FIG. 10 with a pin extended through the mat.
Figure 12:
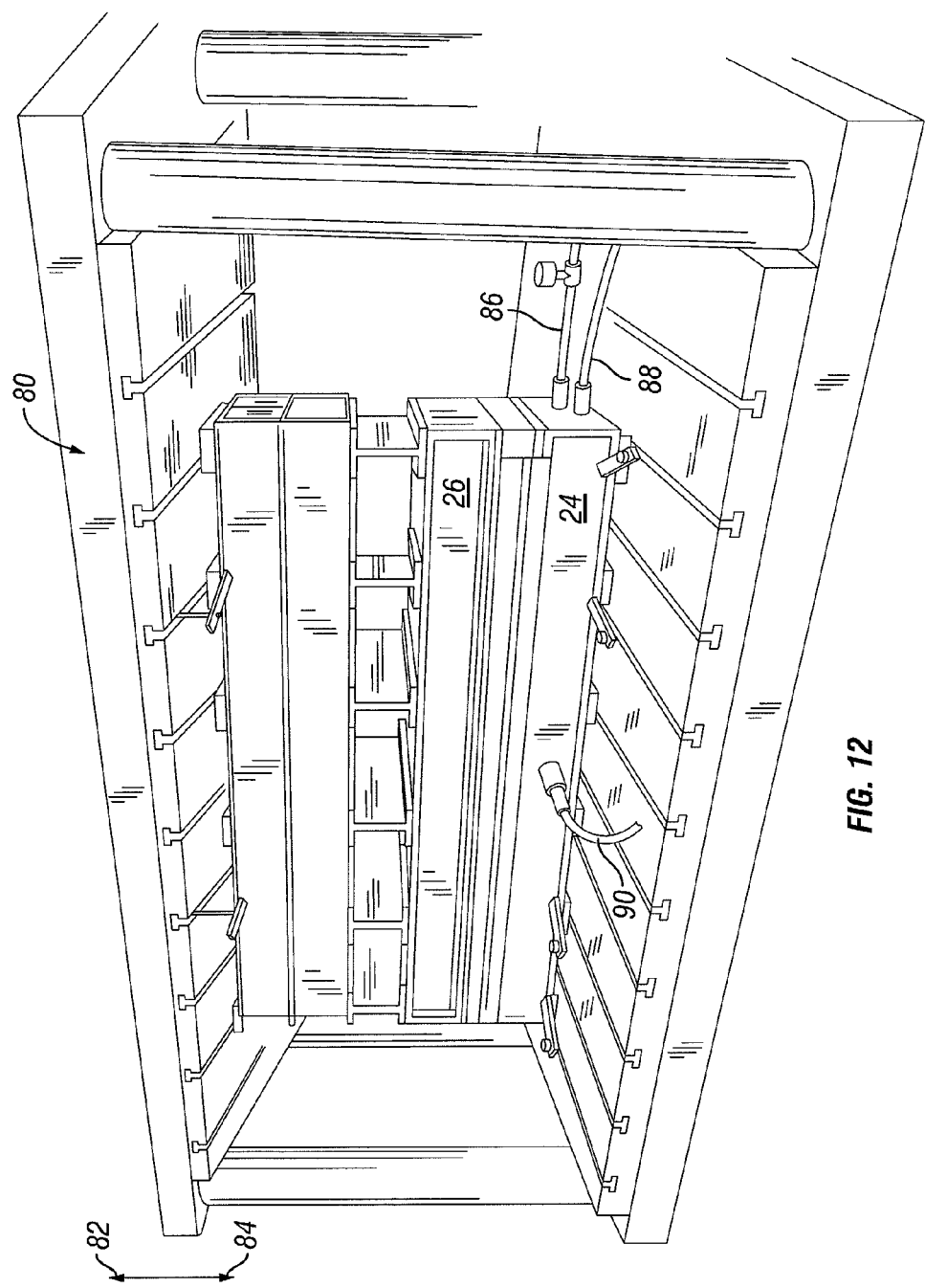
FIG. 12 is a perspective view of a press assembly with tool plates in the closed position.
Figure 13:
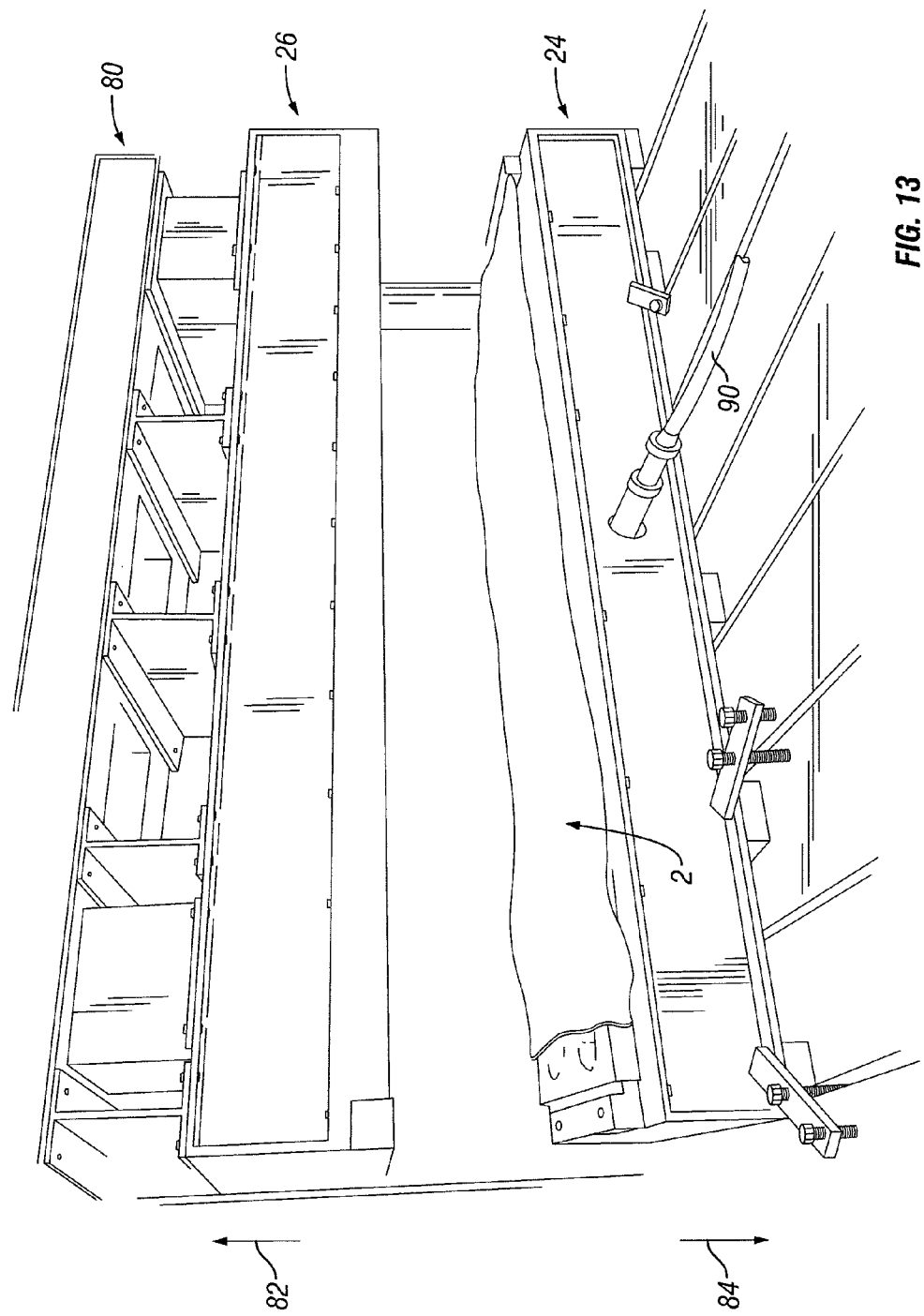
FIG. 13 is a perspective view of a press assembly with the tool plates in the open position and with a resulting blow-molded panel laying on top of the bottom tool plate.

FIGS. 9-13 show an actual operating press and blow-mold tool assembly. A perspective view of an illustrative bottom tool 24 is shown in FIG. 9. This view shows the several holes 62 that are in fluid communication with vacuum line 36 to draw the fiber mat against surface 40. Also shown is hole 64 which receives injector pin 38. A randomly oriented natural fiber/polypropylene mat 6 laying on tool 24 and is being drawn by vacuum line 36 and holes 62 (similar to that shown in FIGS. 4a-c) is shown in FIG. 10. In this view the contours of ribs 30 can be generally identified. A similar view of mat 6 is shown in FIG. 11. This view, however, also includes injector pin 38 piercing its way through mat 6 and film 18. The perspective view of the press assembly 80 in FIG. 12 shows how a conventional press movable in directions 82 and 84 can be used with tooling 24 and 26 to accomplish the blow-molding process. In this particular view, a composite is being formed. Air injector lines 86 and 88 provide fluid such as air to pathways 32 and 34. (see FIGS. 36 and C). Also, vacuum line 90 is disposed in lower tooling 24. Consequently, the view in FIG. 13 shows the press assembly 80 opened and the resulting blow-molded composite 2 made from the afore-described process.

In an illustrative embodiment, a purpose of an upper layer of the blow-molded composite is to transmit applied load to the lower layer. The upper layer may also act as the binding medium to secure the formed lower sheet ribs. The upper layer may further provide the mean shear plane allowing the applied load to be distributed into the lower layer utilizing its tensile strength as the primary load bearer and less to the lower sheets layer's flexural strength. Illustratively, functions of the ribbing include fixing the distance between the upper and lower layers so the lower layer may carry at least some of the applied load in tension, serve as a three dimensional stress skin panel, and provide additional stiffness strength.

Considerations that exist when formulating the upper layer may include: mold thickness and weight along with specific polymer chemistry to meet designed impact strength requirements; bonding characteristics of finished fabrics; and balance to stabilize the finished form (i.e., no warp in part after removal from tool) if desired. Considerations that exist when formulating the lower layer may include: mold thickness and weight to maximize tensile strength to meet load bearing requirements; design of ribbing to reduce weight of lower sheet for competitive, stiffness and spot load requirements; and placement of clips and/or mounting brackets if used in the mold. In addition, the density of needle punch related to rib radius may be considered. This allows to the material to fully and freely stretch and draw in the mold using the preform vacuum and then high pressure air or a combination of air and mechanical force during final forming. The needle punch density will determine how well the fibers are locked together. The higher the needle punch density, the greater resistance there is to stretch and draw.

Illustrative upper sheet compositions may comprise: natural fibers ranging from about 0% of formulation up to about 70% of formulation; synthetic (glass, carbon and other similar mineral type fibers, for example) fiber ranging from about 0% of formulation up to about 70% of formulation; polymer fibers (polypropylene, polyester, nylon 11, 6, 66 and C-35, polyethylene, for example) in percentages from about 30% up to about 70% of formulation; illustrative composition weights may include about 800 grams per meter square to about 3000 grams per meter square; a needle punch density from about 20 per square centimeter up to about 80 per square centimeter and a lamination layering containing but not limited to outer layer of polypropylene and polyester fiber, and inner layer of glass fiber and an outer layer of natural fiber and polypropylene fiber.

Illustrative lower sheet compositions may comprise: natural fibers ranging from about 30% of formulation up to about 60% of formulation (the percentage of non-melt fibers may be dependent on the desired stretch and draw to form the ribs as well as desired tensile load strength required to minimize load deflection); synthetic (glass, carbon and other similar mineral type fibers, for example) fiber ranging from about 30% of formulation to about 60% of formulation (the percentage of non-melt fibers may be dependent on the desired stretch and draw to form ribs as well as desired tensile load strength required to minimize load deflection); polymer fibers (polypropylene, polyester, nylon 11, 6, 66 and C-35, polyethylene, for example) in percentages from about 40% to about 70% of formulation; illustrative composition weights may include about 800 grams per meter square to about 3000 grams per meter square; a needle punch density from about 20 per square centimeter up to about 65 per square centimeter; and lamination layering comprising but not limited to an outer layer of polypropylene and polyester fiber and an inner layer of glass fiber and an outer layer of natural fiber and polypropylene fiber.

The following are non-limiting examples of blow-molded composites:

Composite One.

Upper sheet includes an 1800 gram randomly-oriented fiber composition containing 50% natural fiber, 50% polypropylene fiber constructed with 70 needle punches per square centimeter.

Lower sheet formulation is identical to upper sheet formulation.

Composite Two.

Upper sheet includes a 1600 gram randomly-oriented fiber composition containing 50% natural fiber, 25% nucleated polypropylene and 25% maleic polypropylene fiber constructed with 65 needle punches per square centimeter.

Lower sheet formulation is identical to upper sheet formulation.

Composite Three.

Upper sheet includes an 1800 gram randomly-oriented fiber composition containing 50% natural fiber, 50% maleic polypropylene fiber constructed with 65 needle punches per square centimeter.

Lower sheet formulation is identical to upper sheet formulation. It is appreciated that different formulations for upper and lower sheets can be used.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A blow-molded composite comprising:
   a first fibrous mat comprising randomly oriented fibers dispersed throughout the thickness of the mat and having first and second opposed surfaces;
   a first film layer having first and second opposed surfaces wherein the second surface of this layer is bonded to the second surface of the first fibrous mat;
   a second film layer having first and second opposed surfaces wherein only a portion of the first surface of the second film layer is bonded to the first surface of the first film layer, and wherein at least one cavity exists between the first surfaces of the first and second film layers adjacent the portion of the first surface of the second film layer that is bonded to the first surface of the first film layer;
   wherein the portions of the first and second film layers that are bonded together are directly bonded;
   a second fibrous mat comprising randomly oriented fibers dispersed throughout the thickness of the mat and having first and second opposed surfaces wherein the second surface of the second fibrous mat is bonded to the second surface of the second film layer; and
   wherein the at least one cavity formed between the first and second film layers was formed by blown deformation.

2. The blow-molded composite of claim 1, wherein the fibers are selected from a group consisting of synthetic fibers and natural fibers, and wherein the fibers are present in an amount ranging from over 0 wt. % to about 70 wt. % of the formulation.

3. The blow-molded composite of claim 1, wherein the first and second fibrous mats comprise a binder that is bonded with the fibers.

4. The blow-molded composite of claim 3, wherein the binder is selected from a group consisting of polypropylene, polyester, nylon, and polyethylene, and wherein the binder is present in an amount ranging from over 0 wt. % to about 70 wt % of the formulation.

5. The blow-molded composite of claim 1, wherein the first and second film layers resist bonding to each other at about their melting temperatures.

6. The blow-molded composite of claim 1, wherein the first and second film layers each comprise nylon-6, 66.

7. The blow-molded composite of claim 1, wherein the first surface of the first and second film layers comprise a corona surface, and wherein the second surfaces of the first and second film layers are non-corona surfaces.

8. The blow-molded composite of claim 3, wherein the first fibrous mat comprises: a weight of about 800 grams per meter square to about 3000 grams per meter square; fibers that are natural or synthetic fibers present in an amount ranging from above 0 wt. % up to about 70 wt. % of formulation; the binder being polymer fibers present in an amount ranging from about 30% up to about 70 wt. % of formulation; and a needle punch density from about 20 per square centimeter up to about 80 per square centimeter.

9. The blow-molded composite of claim 3, wherein the second fibrous mat comprises a weight of about 800 grams per meter square to about 3000 grams per meter square; fibers that are natural or synthetic fibers present in an amount ranging from about 30 wt. % up to about 60 wt. % of formulation; the binder being polymer fibers present in an amount ranging from about 40 wt. % up to about 70 wt. % of formulation; and a needle punch density from about 20 to about 65 per square centimeter.

10. A blow-molded composite comprising:
   a first fibrous mat comprising randomly oriented fibers and a binder dispersed throughout the thickness of the mat and having first and second surfaces;
   a first film layer having first and second surfaces wherein the second surface of this layer is bonded to the second surface of the first fibrous mat;
   a second film layer having first and second surfaces;
   wherein at least the first fibrous mat and the first film layer both suffer from blown air deformation between the first and second film layers that forms a cavity therebetween;
   wherein the deformation of at least the first fibrous mat and the first film layer is directed outward from the cavity and at least the second film layer;
   wherein only a portion of the first surface of the second film layer is bonded to the first surface of the first film layer about the periphery of the cavity; and
   a second fibrous mat comprising randomly oriented fibers dispersed throughout the thickness of the mat and having first and second surfaces wherein the first surface of the second fibrous mat is bonded to the second surface of the second film layer.

* * * * *